United States Patent [19]
Sanderson

[11] 3,951,807
[45] Apr. 20, 1976

[54] WATER CONDITIONING APPARATUS

[76] Inventor: Charles H. Sanderson, 3717 Fritcha Ave., Fort Wayne, Ind. 46806

[22] Filed: Oct. 29, 1974

[21] Appl. No.: 518,243

Related U.S. Application Data

[63] Continuation-in-part of Ser. No. 399,164, Sept. 20, 1973, abandoned.

[52] U.S. Cl. ............................... 210/222; 335/284
[51] Int. Cl.² ......................................... B01D 35/06
[58] Field of Search ............ 210/222, 223; 209/221; 335/284; 317/201

[56] References Cited
UNITED STATES PATENTS

| | | | |
|---|---|---|---|
| 2,825,464 | 3/1958 | Mack | 210/223 X |
| 2,937,710 | 5/1960 | Michael et al. | 210/222 X |
| 2,939,830 | 6/1960 | Green et al. | 210/222 X |
| 3,206,657 | 9/1965 | Moriya | 210/222 |
| 3,228,868 | 1/1966 | Rustim | 210/222 X |
| 3,418,613 | 12/1968 | Trikilis | 335/284 |
| 3,669,274 | 6/1972 | Happ et al. | 210/222 |
| 3,680,705 | 8/1972 | Happ et al. | 210/222 |

*Primary Examiner*—Theodore A. Granger
*Attorney, Agent, or Firm*—Shlesinger, Arkwright, Garvey & Dinsmore

[57] ABSTRACT

An apparatus for the treatment of water which includes an elongated magnet having a multiplicity of longitudinally spaced poles enclosed in an inner casing of non-magnetic material, the latter being received within an outer casing of magnetic material and in radially spaced-apart relationship thereto. The apparatus is further provided with novel porting and the magnet, non-magnetic casing and outer casing are dimensioned and proportioned to provide improved fluid flow thereabout.

20 Claims, 4 Drawing Figures

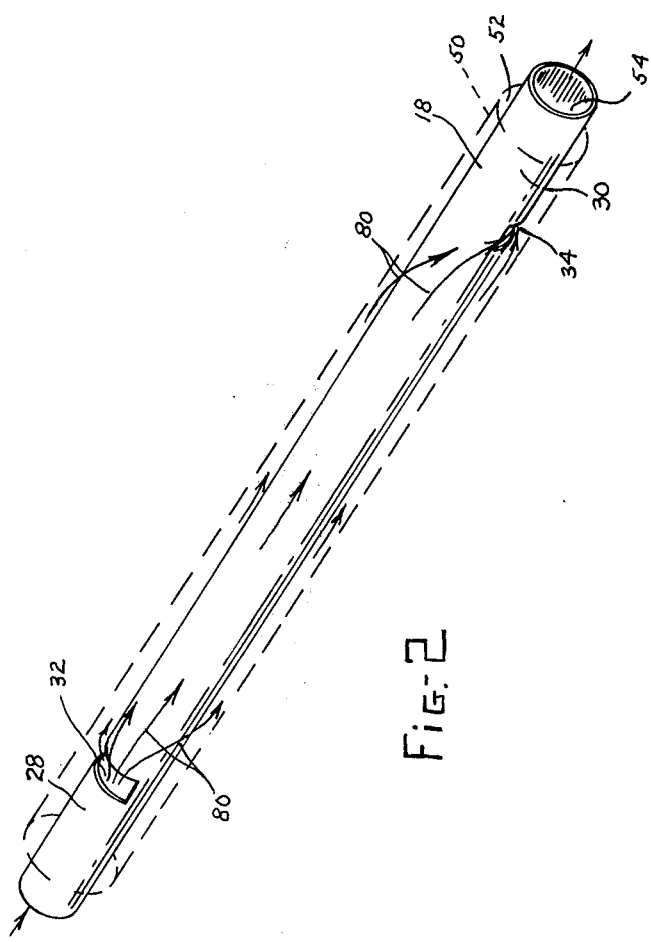
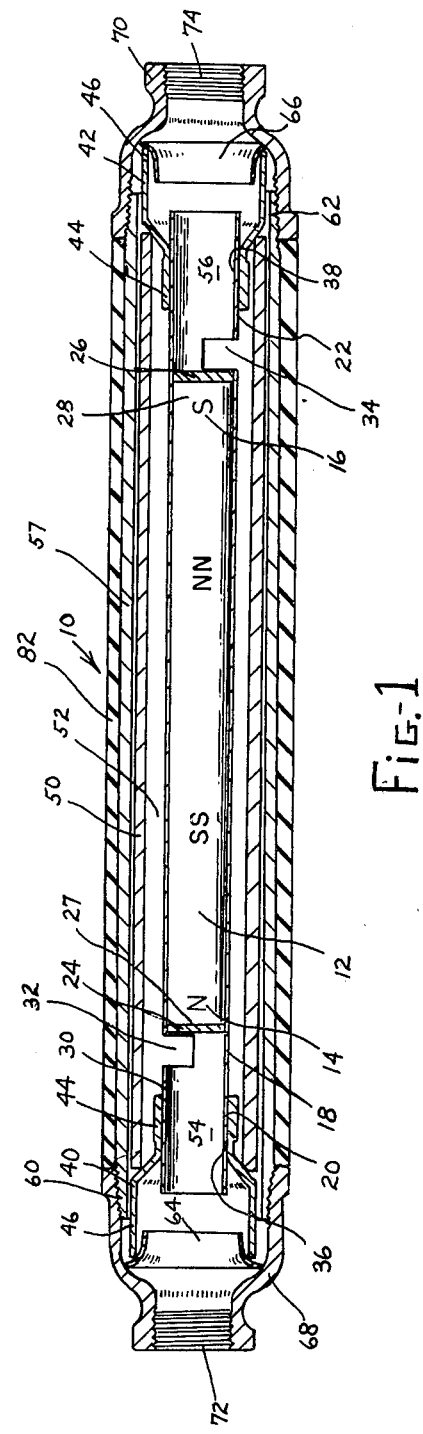

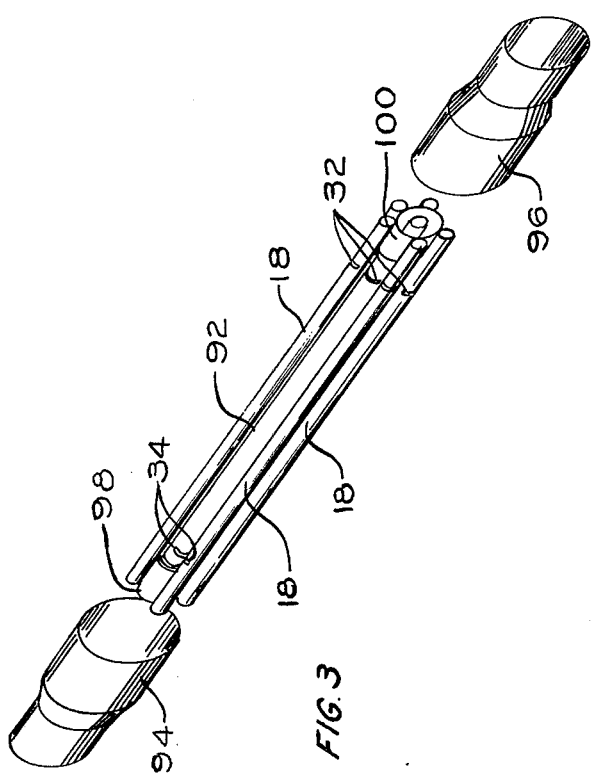
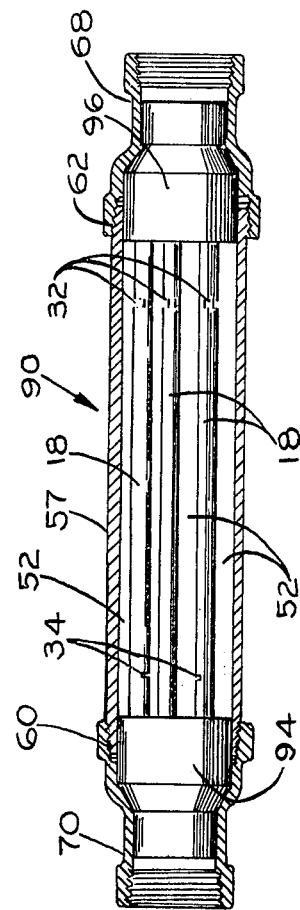

WATER CONDITIONING APPARATUS

This application is a continuation-in-part of application Ser. No. 399,164, filed Sept. 20, 1973, for WATER CONDITIONING APPARATUS now abandoned.

BACKGROUND OF THE INVENTION

1. Field of the Invention

The present invention relates to an apparatus for treating water to reduce the buildup of scale in water systems and in particular to such a device which includes a cylindrical, multipoled magnetic core and an outer casing of magnetic material disposed in radially spaced-apart relationship thereto and including ports for causing the water to pass through the magnetic field between the magnet and the magnetic casing.

2. Description of the Prior Art

Numerous devices and/or systems have been proposed and are in use for treating water to reduce the hardness, impurities, and the like, thereof. One such problem in systems utilizing a flow of water such as heat exchangers is the buildup of scale within the system. The scale is generally comprised of deposits of calcium, magnesium, and the like. Removal of the scale is expensive, time consuming, and frequently results in a deterioration of the system over a period of time.

One device for treating water is proposed in U.S. Pat. No. 2,825,464, to Sidney S. Mack. In this device, water is caused to pass through a magnetic field. The effect on the water of passing it through the magnetic field is not fully understood. However, it is surmised that the magnetic field affects the ions associated with hardness in water and the polarized molecules of the water. Irrespective of an understanding of the mechanism of this type of treatment device, the device has been found to be effective in reducing the buildup of scale and corrosion within water systems. Specifically, passage of water through a water treatment apparatus in accordance with the present invention causes the materials that ordinarily form scale therein to form, instead, a loose slurry or mud-like substance which can be easily removed from the system by a simple blowdown or flushing.

SUMMARY OF THE INVENTION

Broadly, the invention is an improved apparatus of this latter described type for the treatment of water. The apparatus comprises an outer cylindrical casing of magnetic material and an inner cylindrical casing of non-magnetic material that is received in spaced-apart relationship within the outer casing. A single, elongated magnet is coaxially received in the inner casing, the magnet having a multiplicity of longitudinally spaced-apart poles with poles of opposite polarity being uniformly spaced apart. The outer casing and the magnet are dimensioned to establish therebetween a substantially radial magnetic field. The magnet is shorter than the inner casing and means are disposed inwardly of the ends of the inner casing for sealably closing the ends of the inner casing and maintaining the magnet in a fixed longitudinal position therein. Novel inlet and outlet openings extend through the logitudinal and diametrically opposite wall portions of the inner casing, the openings being disposed longitudinally outwardly of the closing means. The openings communicate between the interiors of the end portions and the space between the inner and outer casings. Means are provided for coupling the interiors serially to a fluid conduit, whereby fluid entering one of the interiors adjacent the inlet opening is caused to pass through the magnetic field and exit through the outlet opening. By reason of the position of the openings the water is caused to cut the magnetic field and thereby be subjected to the magnetic field more completely than in prior art water treatment apparatus of this type.

It is therefore an object of the invention to provide an improved water treatment apparatus.

It is another object of the invention to provide an improved water treatment apparatus of the type in which water is caused to pass through a strong magnetic field.

It is still another object of the invention to provide such an apparatus which includes novel fluid passing openings whereby the water passing therethrough is more fully subjected to a magnetic field.

It is yet another object of the invention to provide such an apparatus which includes an external corrosion resistant casing.

It is another object of the invention to provide such an apparatus which is simple in construction, economical to produce and reliable in operation.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is an axial sectional view of a water treatment apparatus in accordance with the present invention;

FIG. 2 is a perspective view of the inner casing of the present invention showing the relative relationship of the fluid passing openings;

FIG. 3 is a perspective and exploded view showing a modified version of the water treatment apparatus illustrated in FIG. 1 which includes a plurality of inner casings, identical to those shown in FIG. 2, arranged in a spaced-apart relation in a bundle, and illustrating the stepped collars which position the bundle within the outer casing and couple the inner casings to a fluid conduit, exploded from the opposite ends thereof; and FIG. 4 is a side view of a water treatment apparatus in accordance with the present invention, incorporating the structure illustrated in FIG. 3, showing the outer casing and the end couplings sectioned so as to expose the inner structure thereof.

DESCRIPTION OF THE PREFERRED EMBODIMENT

Referring now to FIGS. 1 and 2 of the drawings, a water treatment apparatus indicated generally at 10 comprises an elongated, cylindrical magnet 12. Magnet 12 is magnetized along its longitudinal axis and consists of at least two but preferably three successive magnetic domains extending transversely throughout the magnet and having their magnetic moments alternately oppositely aligned such that a multiplicity of longitudinally spaced-apart sections of alternating north and south polarity exists. Preferably, these sections are uniformly spaced apart. The north and south poles themselves (such as at 14, 16) are denoted by the letters "N" and "S" respectively. A magnet such as this may be produced by imposing on a bar of magnetic material three longitudinally displaced static magnetic fields of alternating polarity. Although specifically directed to a two domain bar magnet, a suitable method for accomplishing this magnetization is generally disclosed in U.S. Pat. No. 3,418,613 to Trikilis. Magnet 12 is slidably received within a suitably dimensioned cylindrical, inner casing 18. Casing 18 is made of a non-magnetic material such as, for example, copper, inner casing 18 being longer than magnet 12. Inwardly of the ends, 20, 22 of inner casing 18 are fitted a pair of closure members 24, 26, respectively. Closure members 24, 26 abut the ends 27, 28 of magnet 12 retaining same in fixed longitudinal position therein. Closure members 24, 26 may be secured as by soldering.

Inner casing 18 is provided with a pair of fluid passing openings 32, 34, positioned a small dimension longitudinally outwardly of closure members 24, 26. Each of openings 32, 34 is generally arcuate and rectangular in cross-section when viewed perpendicular to the axis (not shown) of inner casing 18. It will be observed from FIG. 1 that the openings 32 and 34 are positioned adjacent the opposite ends of the casing 18, extending through the end portions 36, 38 thereof and through the diametrically opposite sides of the wall thereof.

A pair of stepped diameter collars 40, 42 each have a narrow portion 44 the inside diameter of which is dimensioned to be slidably received on the outside surface of inner casing 18. Each of collars 40, 42 further is provided with a larger diameter portion as at 46 which extends axially outwardly of inner casing 18 as seen in FIG. 1. An outer casing 50, made of a material of high magnetic permeability such as, for example, iron, has an inside diameter dimensioned to be slidably received on the outside surface of the smaller diameter portions 44 of collars 40, 42. The longitudinal dimension of outer casing 50 is selected such that outer casing 50 is longitudinally retained by collars 40, 42 again as seen in FIG. 1. A space 52 exists between inner casing 18 and outer casing 50 by reason of the dimensions thereof. It will further be observed that the openings 32, 34 communicate from the interiors 54, 56 of the end portions 36, 38 of inner casing 18 and the space 52.

A generally cylindrical jacket 57 has an inside diameter dimensioned to be slidably received on the outside surface of the larger diameter portions 46 of stepped collars 40, 42 and has a longitudinal dimension such that it extends about the distance between the distally disposed edges of the collars 40, 42. Jacket 57 may also be made of a highly magnetically permeable material such as iron. Both outer casing 50 and jacket 57 are preferably galvanized to resist corrosion thereof.

The distal ends 60, 62 of jacket 57 are externally threaded. A pair of flared inserts 64, 66 are received into the larger diameter portions of collars 40, 42 as seen in FIG. 1. A pair of standard pipe fittings 68, 70 are threadingly received on the threaded end portions 60, 62 of jacket 57, the fittings 68, 70 abuttingly maintaining inserts 64, 66 in their illustrated positions.

Fittings 68, 70 may be denoted respectively as "inlet" and "outlet" and it will be observed that they provide "inlet" and "outlet" openings 72, 74, respectively, through which water may enter and exit the apparatus 10. As best seen in FIG. 2, water entering through "inlet" opening 72 enters the interior 54 of inner casing 18 and passes outwardly therefrom via opening or port 32. The water is then caused to travel longitudinally through the apparatus 10 as shown by arrows 80 (FIG. 2 only) thereby cutting the magnetic flux of the magnetic field generated between a magnet 12 and outer casing 50. When the water approaches stepped collar 42 it is exhausted through opening 34 entering interior 56 (FIG. 1 only) and outwardly via "outlet" opening 74. By reason of the diametrically opposite positioning of openings 32, 34, the relatively thin cross-section of the space 52, and the high magnetic permeability of outer casing 50, the water travelling through space 52 is caused to substantially cut the magnetic flux of the aforementioned magnetic field.

Now referring to FIGS. 3 and 4, a modified version 90 of the water treatment apparatus of the invention is shown. Apparatus 90 includes many parts of the water treatment apparatus 10 illustrated in FIGS. 1 and 2 and described hereinabove. In the description of apparatus 90 hereinbelow, like parts will bear like reference numerals; the description of these parts hereinabove is intended to suffice therefore.

Apparatus 90 includes an enclosure comprising jacket 57 and fittings 68, 70. The structure enclosed by jacket 57 and fittings 68 and 70 is illustrated in FIG. 3. This structure includes a magnet bundle 92 and a pair of oppositely disposed stepped collars 94 and 96. The bundle 92 comprises a plurality of inner casings 18. The above description of the inner casing 18, the magnet 12 positioned therein, the closure members 24, 26, and the fluid passing openings 32, 34, pertain to each of the inner casings 18 of bundle 92.

As shown, the inner casings 18 are arranged in a spaced-apart and generally parallel relationship to each other. The axes of the casings 18 (not shown) are also generally parallel and in transverse cross-sections of the casings 18 and are generally equally spaced around the axis of the centrally located casing 18 so as to define a circle and the center thereof. The magnets within each of the casings 18 have spaced-apart poles, as shown in FIG. 1. These magnets are arranged such that transverse cross-sections thereof taken through any pole of any one of the magnets also passes through poles of like polarity of the remaining magnets. Further, the arrangement of the casings 18 are such that transverse cross-sections thereof taken through the closure members 24, 26 or the openings 32, 34 or the planes defined by either the opposite ends 27, 28 of any one of the casings 18 also passes through the respective like structure of each of the outer casings 18.

In the specific embodiment illustrated, the casings 18 are spaced apart by means of stepped collars 98 and 100. Collars 98 and 100 each have a smaller portion which is joined to the end portions 36, 38 of the centrally located casing 18 for example by soldering. The end portions 36, 38 of the outer casings 18 are similarly joined to the larger portion of the stepped collars 98 and 100, as shown.

As shown, collars 94, 96 are sized such that the larger portions thereof slip over the ends 36, 38 of the outer casings 18 and the smaller portions of the stepped collars 94, 96 fit within the fittings 68 and 70. Thus, as assembled in the manner illustrated in FIG. 4, the stepped collars 98 and 100 space apart the casings 18 and the stepped collars 94 and 96 appropriately position the bundle 92 within the casing 57 and couple both the interiors 54, 56 of the end portions 36, 38 and the space 52 with a fluid conduit connected to the apparatus of the invention by means of the fittings 68, 70.

In the apparatus 90, fittings 68, 70 may be denoted respectively as "inlet" and "outlet" and it will be observed that they provide "inlet" and "outlet" openings 72, 74, respectively, through which water from a water conduit may enter and exit the apparatus 90. Water entering through the "inlet" opening 72 enters the interior of the collar 96 and therefrom may pass either directly into the interiors 54 of any of the inner casings 18 or into the space 52. The water entering the interiors 54 of any of the casings 18 is then caused to travel outwardly therefrom through the ports 32 and longitudinally of the casings 18. The water within the space 52 may either exit directly into the interior of the stepped collar 94 or pass through the ports 34, into the interiors 56 and outwardly through the opening 74. By this structure, all of the water passing longitudinally of the inner casing 18 through the space 52 is caused to substantially cut the magnetic flux of the field created by the plurality of magnets.

In both the apparatus 10 and the apparatus 90 it is highly desirable for the treatment of water thereby, that the water passing through the space 52 be highly turbulent. Additionally, it is highly desirable that the magnetic field within the casing 56 be as strong as possible and as dense as possible. This is achieved by selecting the outer casings 50 and 57 of a material of high magnetic permeability and by selecting magnets 12 having a high magnetic flux. It is also advantageous that the magnetic field within the space 52 be substantially a radial magnetic field. By properly choosing the magnets and dimensioning the outer casing and the magnets in both the apparatus 10 and the apparatus 90, essentially radial magnetic field of extremely high flux density within the space 52 such as is most advantageous is obtained.

By the circuitous path which the water follows through the apparatus 10, the desired turbulence within the space 52 is also provided. Similar turbulence is provided in the apparatus 90 by requiring a portion of the water to pass through the ports 32 and 34 and into the interiors 54 and 56 of the casings 18. However, the total pressure drop experienced by water passing through the apparatus 90 is reduced without deleteriously affecting the operation of the apparatus by allowing a portion of the water passing through the apparatus 90 to pass directly into the space 52 without following the circuitous route aforedescribed. By this structure, the apparatus 90 is particularly desirable for treatment of large quantities of water without experiencing the pressure drop which, for example, would be experienced by using six of the apparatus 10 connected to a water conduit in parallel.

It will further be observed that the entire structure of apparatuses 10 and 90 may be almost entirely fabricated of standard components thereby substantially reducing the cost thereof. The structure is extremely strong and resistant to high pressures as are commonly encountered in closed water systems.

Either the apparatus 10 or 90 may further be provided with an external corrosion shield 82. The shield 82 may be made of a suitable plastic material which is resistant to most corrosive materials. Shield 82 is cylindrical and dimensioned to be slidably received on the outside of jacket 57 and is retained in longitudinal position by abutting engagement with the fittings 68, 70.

The apparatus provides a valuable device for treating water having certain impurities therein which cause the buildup of scale within closed water systems. While the operation of the apparatus and in particular the effect of passing water through the magnetic field is not fully understood, it is known to be effective in causing the scale to form a slurrey or loose particulate material within the water system rather than producing scale which attaches within the system. Correspondingly, the system provided with the apparatus 10 of the invention can be easily cleaned by a simple blowdown or flushing.

While there have been described above the principles of this invention in connection with specific apparatus, it is to be clearly understood that this description is made only by way of example and not as a limitation to the scope of the invention.

What is claimed is:

1. In a device for the magnetic treatment of liquids comprising an elongated hollow outer casing made of a magnetic material, an elongated inner casing made of a non-magnetic material positioned within the outer casing and spaced therefrom to form an annular chamber therebetween, external inlet and outlet means for providing fluid flow from an external supply through the annular chamber, the improvement comprising: a single elongated magnet being received in said inner casing and aligned longitudinally, said magnet being magnetized along its longitudinal axis and consisting of at least two adjacent magnetic domains positioned along said longitudinal axis and extending transversely throughout said magnet and having opposing magnetic moments such that there exists at least three longitudinally spaced apart sections of alternating North and South polarity.

2. The device of claim 1 and wherein said inner casing is tubular, and said magnet is encased in said inner casing and spaced inwardly from its ends to form a pair of fluid chambers between the ends of said inner casing and the ends of said magnet.

3. The device of claim 2 and including:
sealing means positioned beyond the ends of said magnet for sealing said fluid chambers from said annular chamber and maintaining said inner casing in fixed spaced relationship relative to said outer casing, and
a pair of openings in said inner casing communicating between said fluid chambers and said annular chamber.

4. The device of claim 3 wherein said sealing means comprises a pair of stepped collars having a first portion in engagement with said outer casing and a reduced second portion in engagement with said inner casing.

5. The device of claim 3 and including means for serially coupling said inlet means and outlet means to a liquid conduit whereby liquid enters one of said fluid chambers, flows through said annular chamber and the magnetic field produced by said magnet and returns to the liquid conduit through the other of said fluid chambers.

6. The device of claim 5 wherein said coupling means includes a generally cylindrical jacket dimensioned to slideably receive said outer casing therein, and first and second pipe couplings threadedly secured to the opposite ends of said jacket.

7. The device of claim 6 further including a cylindrical, chemically resistant corrosion shield enclosing said jacket, said jacket being of magnetic material, said shield being retained between said couplings.

8. The device of claim 3 wherein said openings are arcuate and generally rectangular, each of said openings extending through an arc of about 180°.

9. The device of claim 7 wherein said outer casing is iron, and said inner casing is copper.

10. The device of claim 7 wherein said device is generally cylindrical in shape having an outside diameter substantially equal to the outside diameters of said corrosion shield.

11. The device of claim 6 wherein said coupling means includes a flared insert positioned between said stepped collars and said first and second couplings, the small portion of said insert being smaller than the first portion said collar and larger than the end portion of said inner casing, said largest portion of said insert being larger than said said collar first portion.

12. The device of claim 1 wherein said inner and outer casings are cylindrical.

13. The device of claim 12 wherein said inner and outer casings are coaxial.

14. The device of claim 1 and wherein said magnet and said outer casing are spaced to provide a radial magnetic field therebetween.

15. The device of claim 1 wherein said annular chamber is substantially free from obstructions.

16. In a device for the magnetic treatment of liquids comprising an elongated hollow outer casing made of a magnetic material, a plurality of elongated inner casings made of a non-magnetic material positioned within the outer casing and spaced therefrom, external inlet and outlet means for providing fluid flow from an external supply through the space between said inner casings and said outer casing, the improvement comprising: a single elongated magnet being received in each of said inner casings, each said magnet being magnetized along its longitudinal axis and consisting of at least two adjacent magnetic domains positioned along said longitudinal axis and extending transversely throughout said magnet and having opposing magnetic moments such that there exist at least three longitudinally spaced apart sections of alternating North and South polarity.

17. The device of claim 16 wherein said inner casings are parallel to each other.

18. The device of claim 17 wherein said magnets and said inner casings are arranged such that for all of said magnets, the corresponding sections of like polarity lie generally within the same plane perpendicular to the longitudinal axis of said outer casing.

19. The device of claim 18 wherein one of said inner casings is positioned centrally and the remainder of said inner casings are positioned radially around it.

20. In a device for the magnetic treatment of liquids comprising an elongated hollow outer casing made of a magnetic material, an elongated inner casing made of a non-magnetic material positioned within the outer casing and spaced therefrom to form an annular chamber therebetween, external inlet and outlet means for providing fluid flow from an external supply through the annular chamber, the improvement comprising: a single elongated magnet being received in said inner casing and aligned longitudinally, said magnet being magnetized along its longitudinal axis and consisting of three successive magnetic domains positioned along said longitudinal axis and extending throughout said magnet, adjacent said domains having opposing magnetic moments such that there exist at least four longitudinally spaced apart sections of alternating North and South polarity.

* * * * *